(12) United States Patent
Deguchi et al.

(10) Patent No.: US 8,709,227 B2
(45) Date of Patent: *Apr. 29, 2014

(54) METHOD FOR REDUCING CARBON DIOXIDE

(71) Applicant: Panasonic Corporation, Osaka (JP)

(72) Inventors: Masahiro Deguchi, Osaka (JP); Satoshi Yotsuhashi, Osaka (JP); Yuka Yamada, Nara (JP); Kazuhiro Ohkawa, Saitama (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/740,869

(22) Filed: Jan. 14, 2013

(65) Prior Publication Data

US 2013/0126359 A1 May 23, 2013

Related U.S. Application Data

(63) Continuation of application No. PCT/JP2012/003247, filed on May 17, 2012.

(30) Foreign Application Priority Data

Aug. 31, 2011 (JP) ................................. 2011-188414

(51) Int. Cl.
 *C25B 3/04* (2006.01)
 *C25B 1/00* (2006.01)

(52) U.S. Cl.
 CPC .. *C25B 3/04* (2013.01); *C25B 1/003* (2013.01)
 USPC .......................................................... 205/340

(58) Field of Classification Search
 CPC ................... C25B 1/003; C25B 3/04

USPC .......................................................... 205/340
See application file for complete search history.

(56) References Cited

U.S. PATENT DOCUMENTS 3,649,485 A * 3/1972 Chisholm ..................... 205/504
4,219,392 A * 8/1980 Halmann ..................... 205/340

(Continued)

FOREIGN PATENT DOCUMENTS

JP 53-031576 A 3/1978
JP 55-105625 A 8/1980

(Continued)

OTHER PUBLICATIONS

Zafrir et al, "Photoelectrochemical reduction of carbon dioxide to formic acid, formaldehyde, and methanol on p-gallium arsenide in an aqueous V(II)-V(III) chloride redox system," J. Electroanal. Chem. v. 159 (1983), pp. 373-389.*

(Continued)

*Primary Examiner* — Keith Hendricks
*Assistant Examiner* — Colleen M Raphael
(74) *Attorney, Agent, or Firm* — McDermott Will & Emery LLP

(57) ABSTRACT

A method for reducing carbon dioxide utilizes a carbon dioxide reduction device including a cathode chamber, an anode chamber, a solid electrolyte membrane, a cathode electrode and anode electrode. The cathode electrode includes copper or copper compound. The anode electrode includes a region formed of a nitride semiconductor layer where an $Al_xGa_{1-x}N$ ($0<x\leq1$) layer and a GaN layer are stacked. The anode electrode is irradiated with a light having a wavelength of not more than 350 nanometers to reduce the carbon dioxide on the cathode electrode.

13 Claims, 4 Drawing Sheets

(56) References Cited

U.S. PATENT DOCUMENTS

| | | | | |
|---|---|---|---|---|
| 4,240,882 A * | 12/1980 | Ang et al. | | 205/340 |
| 4,381,978 A * | 5/1983 | Gratzel et al. | | 205/340 |
| 4,414,080 A * | 11/1983 | Williams et al. | | 205/340 |
| 4,523,981 A * | 6/1985 | Ang et al. | | 205/340 |
| 4,545,872 A * | 10/1985 | Sammells et al. | | 205/340 |
| 4,668,349 A * | 5/1987 | Cuellar et al. | | 205/555 |
| 4,975,161 A * | 12/1990 | Nidola et al. | | 205/532 |
| 5,022,970 A * | 6/1991 | Cook et al. | | 205/340 |
| 6,204,545 B1 * | 3/2001 | Nakata | | 136/250 |
| 7,750,234 B2 * | 7/2010 | Deng et al. | | 136/258 |
| 8,138,380 B2 * | 3/2012 | Olah et al. | | 205/450 |
| 8,313,634 B2 * | 11/2012 | Bocarsly et al. | | 205/440 |
| 8,414,758 B2 * | 4/2013 | Deguchi et al. | | 205/340 |
| 2008/0245672 A1 * | 10/2008 | Little et al. | | 205/555 |
| 2009/0045072 A1 * | 2/2009 | Fujii et al. | | 205/340 |
| 2010/0133110 A1 * | 6/2010 | Nocera et al. | | 205/340 |
| 2011/0143929 A1 | 6/2011 | Sato et al. | | |
| 2011/0203661 A1 * | 8/2011 | Taniguchi et al. | | 136/258 |
| 2012/0228146 A1 | 9/2012 | Deguchi et al. | | |
| 2013/0062216 A1 * | 3/2013 | Yotsuhashi et al. | | 205/340 |
| 2013/0118907 A1 * | 5/2013 | Deguchi et al. | | 205/340 |

FOREIGN PATENT DOCUMENTS

| | | |
|---|---|---|
| JP | 05-059562 A | 3/1993 |
| JP | 06-158374 A | 6/1994 |
| JP | 07-188961 A | 7/1995 |
| JP | 2526396 B2 | 8/1996 |
| JP | 2003-024764 A | 1/2003 |
| JP | 3876305 B2 | 1/2007 |
| JP | 4158850 B2 | 10/2008 |
| JP | 2010-064066 A | 3/2010 |
| JP | 2011-094194 A | 5/2011 |
| WO | WO-2006/082801 A1 | 8/2006 |

OTHER PUBLICATIONS

International Search Report mailed Aug. 23, 2012 issued in corresponding International Application No. PCT/JP2012/003247.

Hori et al., "Production of CO and CH4 in Electrochemical Reduction of CO2 at Metal Electrodes in Aqueous Hydrogencarbonate Solution". Chemistry Letters, The Chemical Society of Japan, pp. 1695-1698 (1985).

Inoue et al., "Photoelectrocatalytic reduction of carbon dioxide in aqueous suspensions of semiconductor powders". Nature vol. 277, pp. 637-638 (Feb. 22, 1979).

Yotsuhashi et al., "CO2 reduction with GaN photo-electrode". The Japan Society of Applied Physics: The 72nd Autumn Meeting, 2011 in Yamagata University (with English abstract), Aug. 29, 2011.

International Search Report mailed Aug. 21, 2012 issued in International Application No. PCT/JP2012/003248.

United States Office Action issued in U.S. Appl. No. 13/740,990 mailed Aug. 13, 2013.

* cited by examiner

METHOD FOR REDUCING CARBON DIOXIDE

This is a continuation of International Application No. PCT/JP2012/003247, with an international filing date of May 17, 2012, which claims priority of Japanese Patent Application No. 2011-188414, filed on Aug. 31, 2011, the contents of which are hereby incorporated by reference.

TECHNICAL FIELD

The present disclosure relates to a method and an apparatus for reducing carbon dioxide.

BACKGROUND

Patent Literatures 1-7 and Non Patent Literature 1 disclose a method for reducing carbon dioxide using light energy.

Patent Literature 1, Patent Literature 2 and Non Patent Literature 1 disclose a method for reducing carbon dioxide utilizing an oxide semiconductor such as titania as a photocatalyst material.

Patent Literature 3 and Patent Literature 4 disclose a technique for reducing carbon dioxide utilizing a photocatalyst material synthesized from predetermined metal and semiconductor.

Patent Literature 5 and Patent Literature 6 disclose a method for reducing carbon dioxide on a cathode electrode formed of a photocatalyst containing semiconductor and metal complex.

Patent Literature 7 discloses a method for reducing carbon dioxide efficiently on a cathode electrode by irradiating an anode electrode formed of semiconductor such as titania with light. According to Patent Literature 7, the method disclosed in Patent Literature 7 requires a solar cell.

CITATION LIST

Patent Literature 1: Japanese Patent Laid-open Publication No. Showa 55-105625A

Patent Literature 2: Japanese Patent Publication No. 2526396B

Patent Literature 3: Japanese Patent Publication No. 3876305B

Patent Literature 4: Japanese Patent Publication No. 4158850B

Patent Literature 5: United States Pre-Grant Patent Publication No. 2011/0143929A1

Patent Literature 6: Japanese Patent Laid-open Publication No. 2011-094194A

Patent Literature 7: Japanese Patent Laid-open Publication No. Hei 7-188961A

Non Patent Literature 1: Nature Vol. 277, Page 637 (1979)

SUMMARY

The present disclosure provides a novel method for reducing carbon dioxide. The present disclosure relates to a method for reducing carbon dioxide using a carbon dioxide reduction device. The method includes a step of (a) preparing the carbon dioxide reduction device. The carbon dioxide reduction device may include a cathode chamber; an anode chamber; a solid electrolyte membrane; a cathode electrode; and an anode electrode. The cathode electrode includes copper or copper compound on the surface thereof and the anode electrode includes a region formed of a nitride semiconductor layer on the surface thereof. An $Al_xGa_{1-x}N$ layer ($0<x\le1$) and a GaN layer are stacked in the nitride semiconductor layer. A first electrolytic solution is stored in the cathode chamber and a second electrolytic solution is stored in the anode chamber. The cathode electrode is in contact with the first electrolytic solution and the anode electrode is in contact with the second electrolytic solution. The solid electrolyte membrane is interposed between the cathode chamber and the anode chamber, the first electrolytic solution contains the carbon dioxide, and the cathode electrode is electrically connected to the anode electrode. The method further includes a step of (b) irradiating the anode electrode with a light having a wavelength of not more than 350 nanometers to reduce the carbon dioxide contained in the first electrolytic solution on the cathode electrode.

The present subject matter provides a novel method for reducing carbon dioxide.

DESCRIPTION OF EMBODIMENTS

The embodiment of the present disclosure is described below.

(Anode Electrode (Photoelectrode))

Figure 1A:
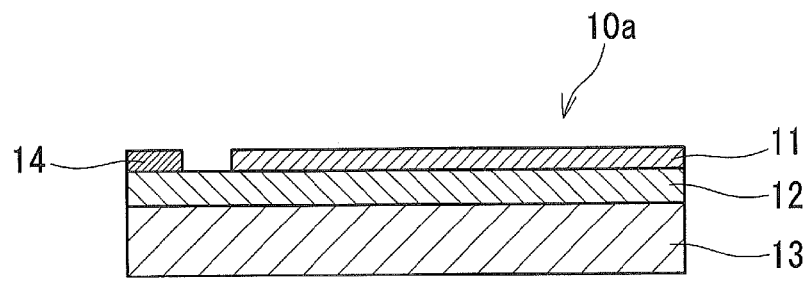
FIG. 1A shows an exemplary cross-sectional view of an anode electrode according to the embodiment.

FIG. 1A-FIG. 1D show cross-sectional views of an anode electrode. FIG. 1A shows a basic structure of the anode electrode 10a. The anode electrode 10a includes an $Al_xGa_{1-x}N$ layer 11 ($0<x\le1$), a GaN layer 12, a substrate 13 and an electrode part 14. The $Al_xGa_{1-x}N$ layer 11 is irradiated with light. The substrate 13 is used to form the GaN layer 12. An example of the substrate 13 is a sapphire substrate or a silicon substrate. A sapphire substrate is desirable. The electrode part 14 is formed on the GaN layer 12.

The light is absorbed in the region formed of the $Al_xGa_{1-x}N$ layer 11 to cause photoexcitation. Carriers generated by the photoexcitation contribute to an oxidation reduction reaction. Each carrier is comprised of an electron and a hole. More particularly, the hole generated in the $Al_xGa_{1-x}N$ layer 11 by the photoexcitation moves to the surface of the anode electrode 10a and oxidizes water which is in contact with the anode electrode 10a, so as to generate oxygen. In other words, the anode electrode 10a serves as an oxygen-generating electrode. On the other hand, the electron generated by the photoexcitation is not consumed in the anode electrode 10a. The electron is supplied to a cathode electrode through the electrode part 14.

Since the bandgap of the $Al_xGa_{1-x}N$ layer 11, namely, the forbidden band width of the $Al_xGa_{1-x}N$ layer 11, is 3.4 eV or more, it is necessary that the $Al_xGa_{1-x}N$ layer 11 is irradiated with light having a wavelength of not more than 350 nanometers to use the $Al_xGa_{1-x}N$ layer 11 as a photoelectrode which uses light. For this reason, it is desirable that the value of x, which represents the composition ratio of aluminum contained in the $Al_xGa_{1-x}N$, is greater than 0 and not greater than 0.25 from the viewpoint of the efficient utilization of the light. It is more desirable that the value of x is greater than zero and not greater than 0.15. However, any value of x (0<x≤1) can be allowed if the $Al_xGa_{1-x}N$ layer 11 is irradiated with light having a wavelength of not less than that corresponding to the bandgap of $Al_xGa_{1-x}N$ layer 11.

The region where the light having the above-mentioned wavelength is absorbed in the $Al_xGa_{1-x}N$ layer extends approximately 100 nanometers in depth from the surface. The depth may depend on the bandgap of $Al_xGa_{1-x}N$. For this reason, it is desirable that the $Al_xGa_{1-x}N$ layer 11 has a thickness of not less than 70 nanometers and not more than 1 micrometer. More desirably, the $Al_xGa_{1-x}N$ layer 11 has a thickness of not less than 80 nanometers and not more than 200 nanometers.

In order to collect the carriers generated by the photoexcitation to the electrode part 14 efficiently, the $Al_xGa_{1-x}N$ layer 11 is formed on the GaN layer 12. The GaN layer 12 is n-type or $n^+$-type. Since the GaN layer 12 is n-type or $n^+$-type, the electric resistance of the GaN layer 12 is decreased. For this reason, ohmic loss may be reduced.

In order to lower the electric resistance of the GaN layer 12 more, it is desirable that the GaN layer 12 contains impurities. An example of the impurity is silicon.

The $Al_xGa_{1-x}N$ layer 11 and the GaN layer 12 are formed by a conventional method for forming a nitride semiconductor film on a silicon or sapphire substrate. When the substrate 13 has conductivity, the electrode structure shown in FIG. 2, which is described later, may be used.

Figure 1B:
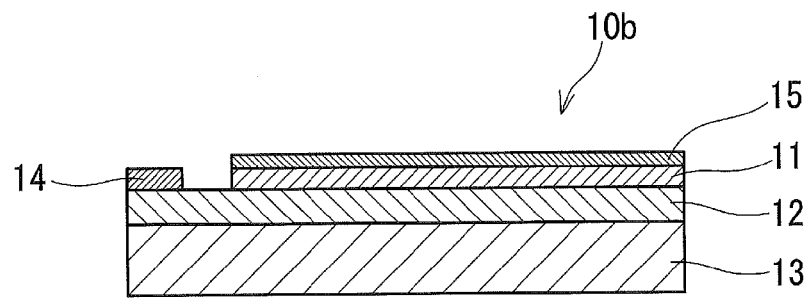
FIG. 1B shows an exemplary cross-sectional view of an anode electrode according to the embodiment.
Figure 1C:
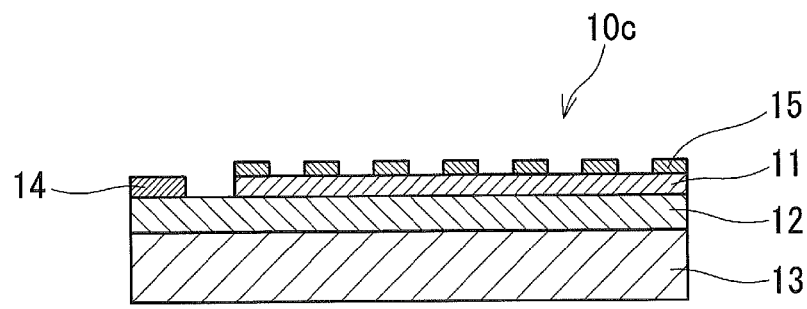
FIG. 1C shows an exemplary cross-sectional view of an anode electrode according to the embodiment.
Figure 1D:
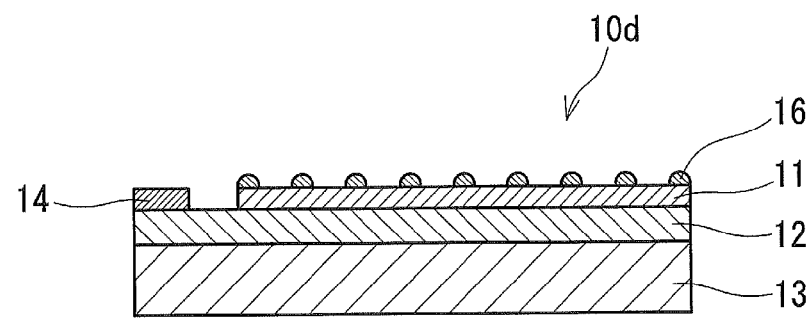
FIG. 1D shows an exemplary cross-sectional view of an anode electrode according to the embodiment.

In order to increase the oxygen-generating efficiency and the durability of the anode electrode, as shown in FIG. 1B, a surface-covering layer 15 may be disposed on the surface of the $Al_xGa_{1-x}N$ layer 11. It is desirable that the surface-covering layer 15 is transparent. The surface-covering layer 15 may contain metal fine particles or metallic oxide fine particles. An example of the main component contained in the metal fine particles or the metallic oxide fine particles is nickel. It is desirable that the surface-covering layer 15 has a thickness of not more than 10 nanometers so that the surface-covering layer 15 does not shield the light radiated toward the $Al_xGa_{1-x}$ layer 11. Instead of this, it is desirable that the surface-covering layer 15 may contain metallic oxide fine particles each having a wider bandgap so that the light radiated toward the $Al_xGa_{1-x}$ layer 11 travels through the surface-covering layer 15. In the surface-covering layer 15, an interspace may be provided between two fine particles. As shown in FIG. 1C, it is desirable that the surface-covering layer 15 is disposed so that a part of the surface of $Al_xGa_{1-x}N$ layer 11 is exposed. In this case, it is not necessary that the surface-covering layers 15 have a uniform shape. A plurality of the surface-covering layers 15 having various shapes and various sizes may be dispersed at random on the surface of the $Al_xGa_{1-x}N$ layer 11. Instead of the embodiments shown in FIG. 1B and FIG. 1C, as shown in FIG. 1D, it is also desirable that a plurality of metal fine particles or metal oxide fine particles 16 are dispersed at random on the surface of the $Al_xGa_{1-x}N$ layer 11. See U.S. patent application Ser. No. 13/453,669, which was filed by the present inventors, the entire contents of which are incorporated herein by reference.

Figure 2A:
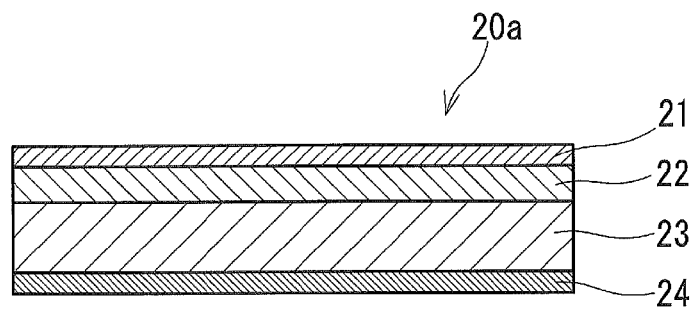
FIG. 2A shows an exemplary cross-sectional view of another anode electrode according to the embodiment.
Figure 2B:
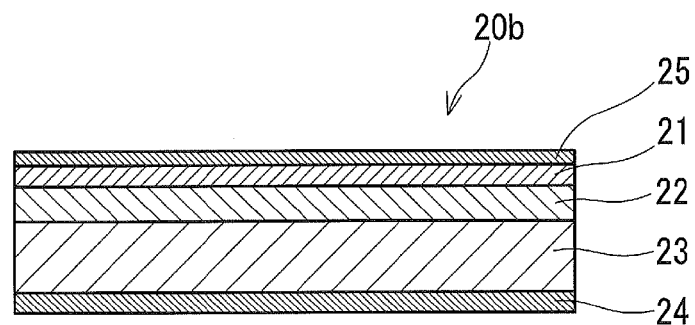
FIG. 2B shows an exemplary cross-sectional view of another anode electrode according to the embodiment.
Figure 2C:
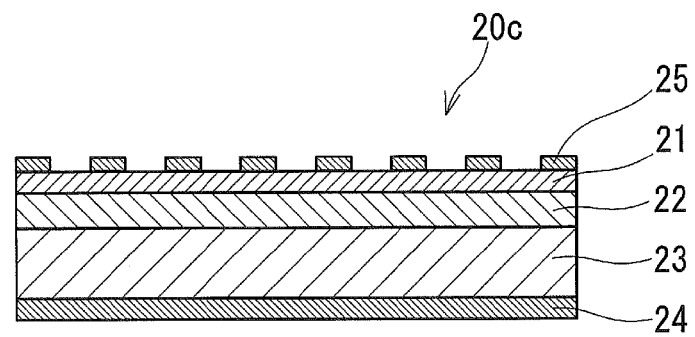
FIG. 2C shows an exemplary cross-sectional view of another anode electrode according to the embodiment.
Figure 2D:
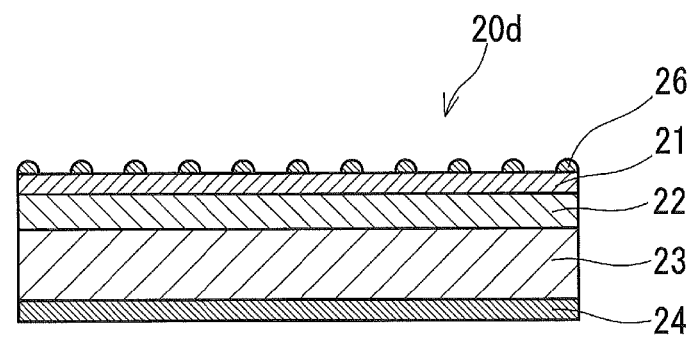
FIG. 2D shows an exemplary cross-sectional view of another anode electrode according to the embodiment.

FIG. 2A-FIG. 2D show cross-sectional views of anode electrodes 20a-20d, each including an electrically-conductive substrate 23, instead of the insulating substrate 13. A GaN layer 22 is formed on the obverse surface of the electrically-conductive substrate 23. An $Al_xGa_{1-x}N$ layer 21 (0<x≤1) is formed on the GaN layer 22. An electrode part 24 having a shape of a layer is formed on the reverse surface of the electrically-conductive substrate 23. In other words, the electrically-conductive substrate 23 is interposed between the GaN layer 22 and the electrode part 24 having a shape of a layer. The electrically-conductive substrate 23 may be a single-crystalline GaN substrate. The GaN layer 22 is identical to the GaN layer 12. The $Al_xGa_{1-x}N$ layer 21 is identical to the $Al_xGa_{1-x}N$ layer 11. The surface-covering layer 25 depicted in FIG. 2B-FIG. 2D is identical to the surface-covering layer 15. Compared to the embodiments shown in FIG. 1A to FIG. 1D, the distance between the $Al_xGa_{1-x}$ layer 21 where the carriers are generated and the electrode part 24 where the generated carriers are collected is shorter. For this reason, ohmic loss generated by the electrical resistance can be reduced.

(Carbon Dioxide Reduction Device)

Figure 3:
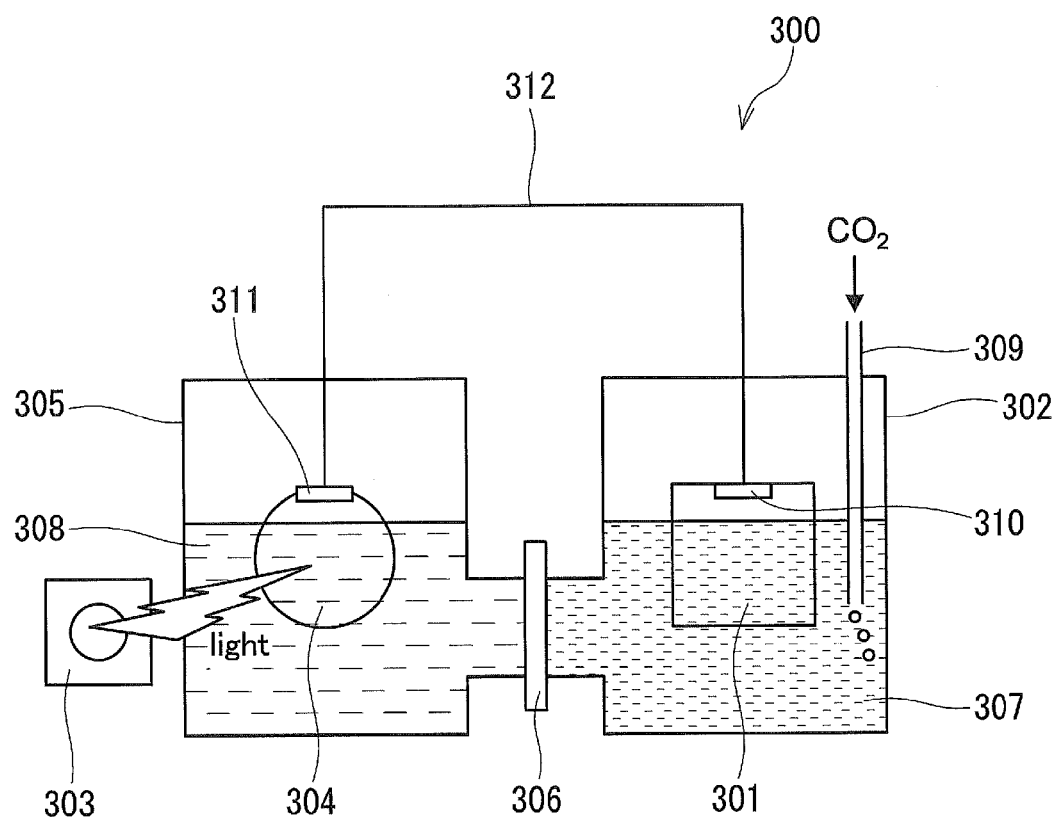
FIG. 3 shows an example of a carbon dioxide reduction device according to the embodiment.

FIG. 3 shows an exemplary schematic view of a carbon dioxide reduction device 300. The device 300 includes a cathode chamber 302, an anode chamber 305 and a solid electrolyte membrane 306.

A first electrolytic solution 307 is stored in the cathode chamber 302. The cathode chamber 302 includes a cathode electrode 301. The cathode electrode 301 is in contact with the first electrolytic solution 307. More particularly, the cathode electrode 301 is immersed in the first electrolytic solution 307.

An example of the first electrolytic solution 307 is a potassium bicarbonate aqueous solution, a sodium hydrogen carbonate aqueous solution, a potassium chloride aqueous solution, a potassium sulfate aqueous solution or a potassium phosphate aqueous solution. A potassium bicarbonate aqueous solution is desirable.

The first electrolytic solution 307 contains carbon dioxide. The concentration of the carbon dioxide is not limited. It is desirable that the first electrolytic solution 307 is weakly acidic in a condition where the carbon dioxide is dissolved in the first electrolytic solution 307.

An example of the material composed of the cathode electrode 301 where the carbon dioxide is reduced is metal or metal compound which contains copper as a main component. The cathode electrode 301 may consists only of metal or metal compound which contains copper as a main component. Instead of this, the cathode electrode 301 may include an electrically-conductive substrate and metal or metal compound which contains copper as a main component, and the metal or metal compound is formed on the electrically-conductive substrate. The metal or metal compound formed on the electrically-conductive substrate has a shape of a fine particle or a layer. For example, the cathode electrode 301 may be obtained by forming a metal layer or a metal compound layer containing copper as a main component on an electrically-conductive substrate such as a glassy carbon substrate or by forming dispersing a plurality of fine particles made of metal or metal compound containing copper as a main component. As shown in FIG. 3, at least a part of the cathode electrode 301 may be immersed in the first electrolytic solution 307.

A second electrolytic solution 308 is stored in the anode chamber 305. The anode chamber 305 includes an anode electrode 304. Since the anode electrode 304 is irradiated with light, the anode electrode is a photoelectrode. The anode electrode 304 includes a region formed of a nitride semiconductor where the $Al_xGa_{1-x}N$ layer and the GaN layer are stacked. An example of the anode electrode 304 is an anode electrode 10a. The anode electrode 304 is in contact with the second electrolytic solution 308. More particularly, the anode electrode 304 is immersed in the second electrolytic solution 308.

An example of the second electrolytic solution 308 is an aqueous sodium hydroxide or a potassium hydroxide aqueous solution. A sodium hydroxide aqueous solution is desirable. It is desirable that the second electrolytic solution 308 is strongly basic.

The solute of the first electrolytic solution 307 may be the same as the solute of the second electrolytic solution 308. However, it is desirable that the first electrolytic solution 307 has a different solute from the second electrolytic solution 308.

As described later, the region of the anode electrode 304 immersed in the second electrolyte solution 308 is irradiated with light having a wavelength of not more than 350 nanometers. This light is radiated from a light source 303.

In order to separate the first electrolytic solution 307 from the second electrolytic solution 308, a solid electrolyte membrane 306 may be interposed between the cathode chamber 302 and the anode chamber 305. In other words, the first electrolytic solution 307 and the second electrolytic solution 308 are not mixed with each other in the present carbon dioxide reduction device.

The solid electrolyte membrane 306 is not limited as long as only proton passes through the solid electrolyte membrane 306 and as long as another material does not travel through the solid electrolyte membrane 306. An example of the solid polymer electrolyte membrane 306 is Nafion.

The cathode electrode 301 and the anode electrode 304 include an electrode terminal 310 and an electrode terminal 311, respectively. These electrode terminals 310, 311 are connected by a conductor wire 312 electrically and directly. The external power source such as a battery or a potentiostat is not electrically interposed between these electrode terminals 310, 311.

(Method for Reducing Carbon Dioxide)

Then, a method for reducing carbon dioxide using the carbon dioxide reduction device is described.

The carbon dioxide reduction device 300 can be placed under a room temperature and under an atmospheric pressure.

As shown in FIG. 3, light is radiated from the light source 303 and the anode electrode 304 is irradiated with the light. An example of the light source 303 is a xenon lamp. The light radiated from light source 303 has a wavelength of not more than 350 nanometers. It is desirable that this light has a wavelength of not less than 250 nanometers and not more than 325 nanometers.

As shown in FIG. 3, it is desirable that the carbon dioxide reduction device includes a gas introduction tube 309. While carbon dioxide is supplied to the first electrolytic solution 307 through the gas introduction tube 309, it is desirable that the carbon dioxide contained in the first electrolytic solution 307 is reduced. One end of the gas introduction tube 309 is immersed in the first electrolytic solution 307. Before starting the reduction of the carbon dioxide, it is desirable that the carbon dioxide is supplied to the first electrolytic solution 307 through the gas introduction tube 309 and that the sufficient amount of the carbon dioxide is dissolved in the first electrolytic solution 307.

The carbon dioxide contained in the first electrolytic solution 307 is reduced on the cathode electrode 301, which includes metal or metal oxide which contains copper as a main component, so as to produce at least one kind of carbon monoxide, hydrocarbon and formic acid.

EXAMPLES

The present subject matter is described in more detail with reference to the following examples.

Preparation of Anode Electrode

Example 1

A silicon-doped n-type low-resistance GaN layer (thickness: 2.5 micrometers) was grown on a sapphire substrate by a metalorganic chemical vapor deposition. Next, a non-doped $Al_xGa_{1-x}N$ layer (thickness: 90 nanometers, x=0.11) was grown on the GaN layer by a metalorganic chemical vapor deposition. A part of the $Al_xGa_{1-x}N$ layer was removed. An electrode composed of titanium/aluminum/gold layers was formed on the GaN layer. In this way, an anode electrode shown in FIG. 1A was obtained.

Example 2

A layer containing nickel particles and nickel oxide particles was formed on the $Al_xGa_{1-x}N$ layer of the anode electrode according to the example 1. Thus, an anode electrode shown in FIG. 1D was obtained.

Comparative Example 1

Only a silicon-doped n-type low-resistance GaN layer (thickness: 2.5 micrometers) was grown on a sapphire substrate by a metalorganic chemical vapor deposition to obtain an anode electrode.

(Assembling of the Carbon Dioxide Reduction Device)

The carbon dioxide reduction devices shown in FIG. 3 were fabricated using the anode electrode according to the example 1, the example 2 and the comparative example 1. The detail of the carbon dioxide reduction device is described below.

Cathode electrode: Copper plate
First electrolytic solution: potassium bicarbonate aqueous solution having a concentration of 0.5 mol/L
Second electrolytic solution: sodium hydroxide aqueous solution having a concentration of 1.0 mol/L
Solid electrolyte membrane: Nafion membrane (available from DuPont, trade name: Nafion 117)
Light source: Xenon lamp (power: 300 W)

(Reduction of Carbon Dioxide)

Carbon dioxide was supplied for thirty minutes to the first electrolytic solution 307 through the gas introduction tube 309. During the supply, the first electrolytic solution 307 was bubbled by the carbon dioxide. The anode chamber 305 includes a window (not illustrated). Through this window, the anode electrode was irradiated with the light radiated from the light source 303. This light had a wavelength of not more than 350 nanometers and had a broad spectrum.

Figure 4:
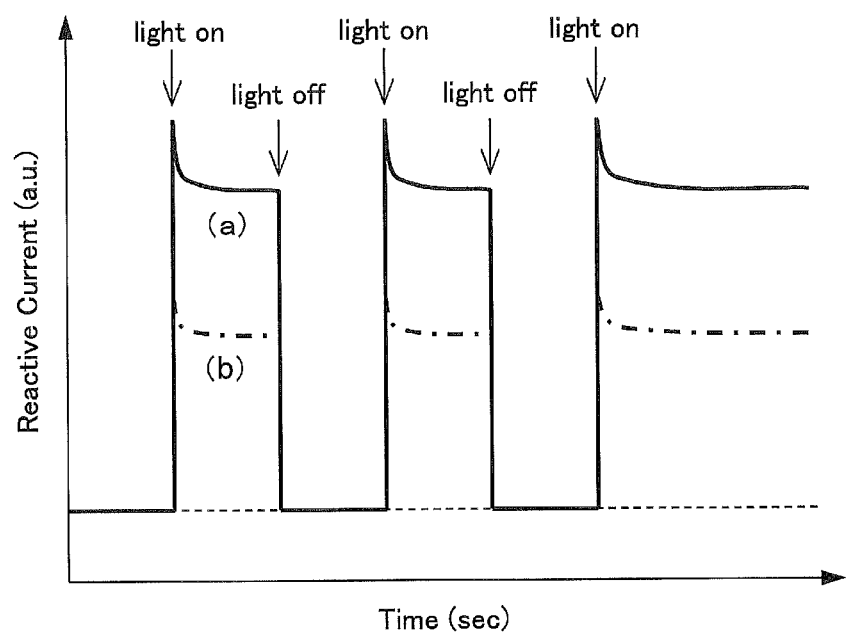
FIG. 4 is a graph showing the results of the example 1 and the comparative example 1.

FIG. 4 is a graph showing the change of the reaction current obtained when the anode electrode 304 was irradiated with the light. The solid line (a) depicted in FIG. 4 shows the result when the anode electrode according to the example 1 was used. The chain line (b) depicted FIG. 4 shows the result when the anode electrode according to the comparative example 1 was used.

As shown in FIG. 4, when the anode electrode was irradiated with the light, the reaction current flowed through the conductor wire 312 in both of the example 1 and comparative example 1. On the contrary, when the irradiation of the light was suspended, the reaction current was not observed. This means that some kinds of reactions occur in the cathode and anode electrodes due to the irradiation of the light.

In the anode electrode according to the example 1, the $Al_xGa_{1-x}N$ layer (x=0.11, band gap: approximately 3.7 eV) serving as a light absorption layer has a greater band gap than the GaN layer (band gap: approximately 3.4 eV) included in the anode electrode according to the comparative example 1. In other words, although the amount of the carriers generated by the photoexcitation is smaller, the anode electrode according to the example 1 has a greater reaction current amount than the anode electrode according to the comparative example 1. This phenomenon has not ever discovered. It is believed that the reason of this phenomenon is that the band modulation caused by the hetero structure of the $Al_xGa_{1-x}N$ layer/the GaN layer included in the anode electrode according to the example 1 suppresses the recombination of the generated carriers to collect the carriers efficiently.

Thus, it was suggested that the anode electrode according to the example 1 was useful as an electrode for reducing carbon dioxide.

The present inventors investigated the carbon dioxide reduction reaction in more detail as below. More particularly, the anode electrode according to the example 1 was irradiated with light in a condition where the cathode chamber was sealed, namely, where the carbon dioxide was encapsulated. The carbon dioxide was reduced in the cathode chamber by the irradiation of the light. The reaction products generated by reducing the carbon dioxide were identified. The amounts of the reaction products were measured. The gas component generated in the cathode chamber was analyzed by a gas chromatography method. The liquid component generated in the cathode chamber was analyzed by a liquid chromatography method. The charge amount associated with the carbon dioxide reduction reaction, namely, the coulomb amount, was calculated on the basis of the reaction current amount generated by the irradiation of the light.

As a result, it was found that formic acid, carbon monoxide and methane were generated in the cathode chamber. Among them, the generation efficiency of the formic acid was high. It was found that each generation amount of the reaction products was proportional to the charge amount associated with the reaction, namely, the coulomb amount. Oxygen was generated in the anode chamber due to the oxidization reaction of the water. The amount of the generated oxygen corresponded to the amount of the reaction product in the cathode chamber.

As above, it was found that the catalytic reaction that reduces the carbon dioxide on the cathode electrode by irradiating the anode electrode with the light was generated. Table 1 shows the generation efficiency of the formic acid obtained by carbon dioxide reduction methods using the anode electrodes according to the example 1, the example 2 and the comparative example 1. The generation efficiency of the formic acid is calculated by the following formula:

(Generation efficiency of the formic acid)=(reaction charge amount used for the formic acid generation)/(all of the reaction charge amounts)×100

TABLE 1

| | Generation efficiency of the formic acid [%] |
|---|---|
| Example 1 | 12.72 |
| Example 2 | 14.15 |
| Comparative example 1 | 2.59 |

Example 3

The experiment similar to the example 1 was conducted, except that x=0.19 (the bandgap: approximately 3.9eV).

Since the wavelength band of the light absorbed in the $Al_xGa_{1-x}N$ layer was different, the amount of the reaction current obtained in the example 3 was decreased a little. However, it was found that the reaction products obtained by reducing the carbon dioxide were the same as those of the example 1.

Example 4

A silicon-doped n-type low-resistance GaN layer (thickness: 2.5 micrometers) was grown on a single-crystalline n-type GaN substrate by a metalorganic chemical vapor deposition. Next, a non-doped $Al_xGa_{1-x}N$ layer (thickness: 90 nanometers, x=0.11) was grown on the obverse surface of the GaN layer by a metalorganic chemical vapor deposition. An electrode composed of titanium/aluminum/gold layers was formed on the reverse surface of the GaN substrate. In this way, an anode electrode shown in FIG. 2A was obtained. The experiment similar to the example 1 was conducted using this anode electrode.

As a result, the obtained reaction products were the same as the reaction products of the example 1. However, in a case where light having the same intensity was radiated, the amount of the reaction current was increased. In other words, it was found that the amount of the carbon dioxide reduction reaction per unit time is increased, since the loss of the current is decreased.

Comparative example 2

The experiment similar to the example 1 was conducted, except that a single-crystalline n-type titania substrate was used as an anode electrode.

As a result, the reaction current was obtained by irradiating the titania substrate with light. However, the amount of the current obtained in the comparative example 2 was approximately one-tenth times as much as that of the example 1. Furthermore, the reaction product in comparative example 2 was hydrogen only. In other words, the reaction product associated with the carbon dioxide reduction reaction failed to be obtained.

As above, it was found that the anode electrode comprising the region formed of the nitride semiconductor where the $Al_xGa_{1-x}N$ layer and the GaN layer were stacked improved the generation efficiency of the formic acid remarkably. Furthermore, it was found that the generation efficiency of the formic acid was improved more by coating the region formed of the nitride semiconductor with the metal fine particles or the metal oxide fine particles containing nickel as a main component.

The copper plate was used as the cathode electrode in the present examples. The similar effect was obtained, even when copper particles supported on a glassy carbon substrate were used instead of the copper plate. The similar effect was also obtained, even when copper-nickel alloy containing copper and a small amount of nickel was used instead of the copper plate.

INDUSTRIAL APPLICABILITY

The present subject matter provides a method for reducing the carbon dioxide.

What is claimed is:
1. A method for reducing carbon dioxide using a carbon dioxide reduction device, the method comprising steps of:

(a) preparing the carbon dioxide reduction device comprising:
- a cathode chamber;
- an anode chamber;
- a solid electrolyte membrane;
- a cathode electrode; and
- an anode electrode, wherein:
- the cathode electrode comprises copper or copper compound on the surface thereof, the anode electrode comprises a region formed of a nitride semiconductor layer on the surface thereof,
- an $Al_xGa_{1-x}N$ layer ($0<x\leq1$) and a GaN layer are stacked in the nitride semiconductor layer,
- a first electrolytic solution is stored in the cathode chamber,
- a second electrolytic solution is stored in the anode chamber,
- the cathode electrode is in contact with the first electrolyte solution,
- the anode electrode is in contact with the second electrolyte solution,
- the solid electrolyte membrane is interposed between the cathode chamber and the anode chamber,
- the first electrolytic solution contains the carbon dioxide, and
- the cathode electrode is connected to the anode electrode electrically; and (b) irradiating the anode electrode with a light having a wavelength of not more than 350 nanometers to reduce the carbon dioxide contained in the first electrolytic solution on the cathode electrode.

2. The method according to claim 1, wherein a value of x is greater than 0 and not more than 0.25.

3. The method according to claim 1, wherein the GaN layer is n-type or n$^+$-type.

4. The method according to claim 1, wherein at least a part of the surface of the $Al_xGa_{1-x}N$ is covered with metal fine particles each containing nickel or with metal oxide fine particles each containing nickel.

5. The method according to claim 1, wherein the first electrolyte is a potassium bicarbonate aqueous solution, a sodium hydrogen carbonate aqueous solution, a potassium chloride aqueous solution, a potassium sulfate aqueous solution or a potassium phosphate aqueous solution.

6. The method according to claim 1, wherein the first electrolyte is a potassium bicarbonate aqueous solution.

7. The method according to claim 1, wherein the second electrolyte is a sodium hydroxide aqueous solution or a potassium hydroxide aqueous solution.

8. The method according to claim 1, wherein in the step (b), the carbon dioxide reduction device is placed under a room temperature and under an atmospheric pressure.

9. The method according to claim 1, wherein in the step (b), at least formic acid is obtained.

10. The method according to claim 1, wherein in the step (b), at least carbon monoxide is obtained.

11. The method according to claim 1, wherein in the step (b), at least hydrocarbon is obtained.

12. The method according to claim 1, wherein in the step (b), at least one of formic acid, carbon monoxide and hydrocarbon is obtained.

13. A method for reducing carbon dioxide using a carbon dioxide reduction device, the method comprising steps of:

(a) preparing the carbon dioxide reduction device including
- a cathode electrode in contact with a first electrolyte solution; and
- an anode electrode in contact with a second electrolyte solution; and (b) irradiating the anode electrode with a light having a wavelength of not more than 350 nanometers to reduce carbon dioxide contained in the first electrolytic solution on the cathode electrode, wherein:
- the cathode electrode comprises copper or copper compound on the surface thereof, and
- the anode electrode comprises a region formed of a nitride semiconductor layer including stacked layers of an $Al_xGa_{1-x}N$ layer ($0<x\leq1$) and a GaN layer.

* * * * *